United States Patent
Babayan

(10) Patent No.: US 12,436,755 B2
(45) Date of Patent: Oct. 7, 2025

(54) TECHNIQUES FOR A REACTION OPERATION WHILE PROCESSING A TASK FOR AN OVER-THE-AIR SOFTWARE UPDATES FOR A VEHICLE

(71) Applicant: Mercedes-Benz Group AG, Stuttgart (DE)

(72) Inventor: Movses Babayan, Monroe, WA (US)

(73) Assignee: Mercedes-Benz Group AG, Stuttgart (DE)

( * ) Notice: Subject to any disclaimer, the term of this patent is extended or adjusted under 35 U.S.C. 154(b) by 152 days.

(21) Appl. No.: 18/326,586

(22) Filed: May 31, 2023

(65) Prior Publication Data

US 2024/0403018 A1 Dec. 5, 2024

(51) Int. Cl.
*G06F 8/65* (2018.01)
(52) U.S. Cl.
CPC .................................... *G06F 8/65* (2013.01)
(58) Field of Classification Search
CPC .................................. G06F 8/65; G06F 9/542
USPC .................................................. 717/120–178
See application file for complete search history.

(56) References Cited

U.S. PATENT DOCUMENTS

| | | | |
|---|---|---|---|
| 9,841,965 B2 * | 12/2017 | Moeller | G06F 8/65 |
| 12,014,164 B2 * | 6/2024 | Jeong | B60L 53/68 |
| 12,093,677 B2 * | 9/2024 | Nagamitsu | G06F 8/65 |
| 12,288,059 B2 * | 4/2025 | Gage | G06F 8/654 |
| 2019/0391800 A1 * | 12/2019 | Lin | G06F 8/65 |
| 2021/0141634 A1 * | 5/2021 | Jeong | G06F 8/658 |
| 2022/0308856 A1 * | 9/2022 | Kim | G06F 8/71 |
| 2022/0382532 A1 * | 12/2022 | Sakai | G06F 21/57 |

FOREIGN PATENT DOCUMENTS

| | | |
|---|---|---|
| CN | 113419903 A | 9/2021 |
| CN | 114201189 A | 3/2022 |
| CN | 114356375 A | 4/2022 |

(Continued)

OTHER PUBLICATIONS

Ghosal, Amrita, Subir Halder, and Mauro Conti. "STRIDE: Scalable and secure over-the-air software update scheme for autonomous vehicles." ICC 2020-2020 IEEE International Conference on Communications (ICC). IEEE, 2020.pp. 1-6 (Year: 2020).*

(Continued)

*Primary Examiner* — Satish Rampuria
(74) *Attorney, Agent, or Firm* — Dority & Manning, P.A.

(57) ABSTRACT

A method relating to an over-the-air (OTA) vehicle software update includes obtaining the OTA vehicle software update for a plurality of vehicles and determining a task for a first vehicle among the plurality of vehicles based on the OTA vehicle software update. The task may be associated with a plurality of task states. The method further includes determining, while processing the task with respect to the first vehicle, that the task has experienced a task state transition from a first task state to a second task state and in response to the task state transition, selecting a reaction operation from a plurality of reaction operations, wherein the reaction operation comprises a computing operation that is to be performed in response to the task state transition. The method further includes processing the reaction operation independently from the first vehicle performing the task.

18 Claims, 9 Drawing Sheets

(56) References Cited

FOREIGN PATENT DOCUMENTS

| CN | 115220756 A | 10/2022 |
|---|---|---|
| CN | 115617371 A | 1/2023 |

OTHER PUBLICATIONS

Andrade, Carlos E., et al. "Managing massive firmware-over-the-air updates for connected cars in cellular networks." Proceedings of the 2nd ACM international workshop on smart, autonomous, and connected vehicular systems and services. 2017.pp. 65-72 (Year: 2017).*

La Manna, Michele, et al. "Assessing the cost of quantum security for automotive over-the-air updates." 2021 IEEE Symposium on Computers and Communications (ISCC). IEEE, 2021.pp. 1-6 (Year: 2021).*

Mundhenk, Philipp, et al. "Security in automotive networks: Lightweight authentication and authorization." ACM Transactions on Design Automation of Electronic Systems (TODAES) 22.2 (2017): pp. 1-27. (Year: 2017).*

Elkhail, Abdulrahman Abu, et al. "Vehicle security: A survey of security issues and vulnerabilities, malware attacks and defenses." IEEE Access 9 (2021): pp. 162401-162437. (Year: 2021).*

Glaser, Markus, et al. "Open standards enable continuous software development in the automotive industry." pp. 1-18. (Year: 2021).*

"Specification of Update and Configuration Management AUTOSAR AP R21-11", AUTOSAR, No. 888, Nov. 30, 2020, pp. 1-155, XP093069977.

"Specification of State Management AUTOSAR AP R22-11", AUTOSAR, No. 908, Nov. 24, 2022, pp. 1-84, XP093165516, Retrieved from the Internet: URL:https://www.autosar.org/fileadmin/standards/R22-11/AP/AUTOSAR_SWS_StateManagement.pdf [retrieved on May 22, 2024].

International Search Report with Written Opinion of the International Searching Authority for the Application No. PCT/EP2024/058505 mailed Jun. 4, 2024.

* cited by examiner

TECHNIQUES FOR A REACTION OPERATION WHILE PROCESSING A TASK FOR AN OVER-THE-AIR SOFTWARE UPDATES FOR A VEHICLE

FIELD

The disclosure relates generally to performing over-the-air (OTA) updates for vehicles. In particular, the disclosure relates to processing a reaction operation while a task is being processed for an OTA update with respect to a vehicle.

BACKGROUND

Over-the-air (OTA) updates refer to the process of wirelessly updating the software of a device, such as a smartphone, Internet of Things (IoT) device, or vehicle. OTA updates allow manufacturers to push updates and patches to devices remotely, without requiring users to connect their device or manually install the updates.

OTA updates are commonly used for fixing software bugs, improving device performance, adding new features, and addressing security vulnerabilities. OTA updates have become increasingly common in recent years as more devices are connected to the internet, making it easier for manufacturers to deliver updates quickly and efficiently.

SUMMARY

Aspects and advantages of implementations of the disclosure will be set forth in part in the following description, or may be learned from the description, or may be learned through practice of the described implementations.

One example aspect of the disclosure is directed to a computer-implemented method relating to an over-the-air (OTA) vehicle software update. The computer-implemented method may include obtaining an OTA vehicle software update for a plurality of vehicles; determining a task for a first vehicle among the plurality of vehicles based on the OTA vehicle software update, wherein the task is associated with a plurality of task states; determining, while processing the task with respect to the first vehicle, that the task has experienced a task state transition from a first task state among the plurality of task states to a second task state among the plurality of task states; in response to the task state transition, selecting a reaction operation from a plurality of reaction operations, wherein the reaction operation comprises a computing operation that is to be performed in response to the task state transition; and processing the reaction operation independently from the first vehicle performing the task.

In an embodiment, the reaction operation is logically and temporally decoupled from the task state transition of the first task state to the second task state.

In an embodiment, selecting the reaction operation from the plurality of reaction operations comprises identifying the reaction operation based on an action associated with the task.

In an embodiment, the action comprises upgrading a software version onboard the first vehicle.

In an embodiment, the method further includes retrieving information about the reaction operation at a time when the first task state transitions to the second task state.

In an embodiment, the method further includes queuing the reaction operation such that the reaction operation is processed asynchronously from the first vehicle performing the task.

In an embodiment, the plurality of vehicles belong to a same class of the vehicles, and the computer-implemented method further comprises: determining an action to be performed by the class of vehicles; and associating the reaction operation with the action.

In an embodiment, the reaction operation comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

In an embodiment, the task corresponds to a connection action of the first vehicle connecting to one or more computing systems via a network, and the connection action is defined by associating the reaction operation with the connection action.

Another example aspect of the disclosure is directed to a computing system having a control circuit. The control circuit may be configured to: obtain an over-the-air (OTA) vehicle software update for a plurality of vehicles; determine a task for a first vehicle among the plurality of vehicles based on the OTA vehicle software update, wherein the task is associated with a plurality of task states; determine, while processing the task with respect to the first vehicle, that the task has experienced a task state transition from a first task state among the plurality of task states to a second task state among the plurality of task states; in response to the task state transition, select a reaction operation from a plurality of reaction operations, wherein the reaction operation comprises a computing operation that is to be performed in response to the task state transition; and process the reaction operation independently from the vehicle performing the task.

In an embodiment, the reaction operation is logically and temporally decoupled from the task state transition of the first task state to the second task state.

In an embodiment, the control circuit is configured to retrieve information about the reaction operation at a time when the first task state transitions to the second task state.

In an embodiment, the control circuit is configured to queue the reaction operation such that the reaction operation is processed asynchronously from the first vehicle performing the task.

In an embodiment, the plurality of vehicles belong to a same class of the vehicles, and the control circuit is configured to: determine an action to be performed by the class of vehicles; and associate the reaction operation with the action.

In an embodiment, the reaction operation processed by the control circuit comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

In an embodiment, the task corresponds to a connection action of the first vehicle connecting to one or more computing systems via a network, and the connection action is defined by associating the reaction operation with the connection action.

Yet another example aspect of the disclosure is directed to one or more non-transitory computer-readable media that store instructions that are executable by a control circuit to perform operations. The control circuit may obtain an over-the-air (OTA) vehicle software update for a plurality of vehicles; determine a task for a first vehicle among the plurality of vehicles based on the OTA vehicle software update, wherein the task is associated with a plurality of task states; determine, while processing the task with respect to the first vehicle, that the task has experienced a task state transition from a first task state among the plurality of task states to a second task state among the plurality of task states; in response to the task state transition, select a reaction operation from a plurality of reaction operations to be processed; and process the reaction operation independently from the first vehicle performing the task.

In an embodiment, the reaction operation is logically and temporally decoupled from the task state transition of the first task state to the second task state.

In an embodiment, the reaction operation comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle Other example aspects of the disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended drawings, in which.

DETAILED DESCRIPTION

Figure 1:
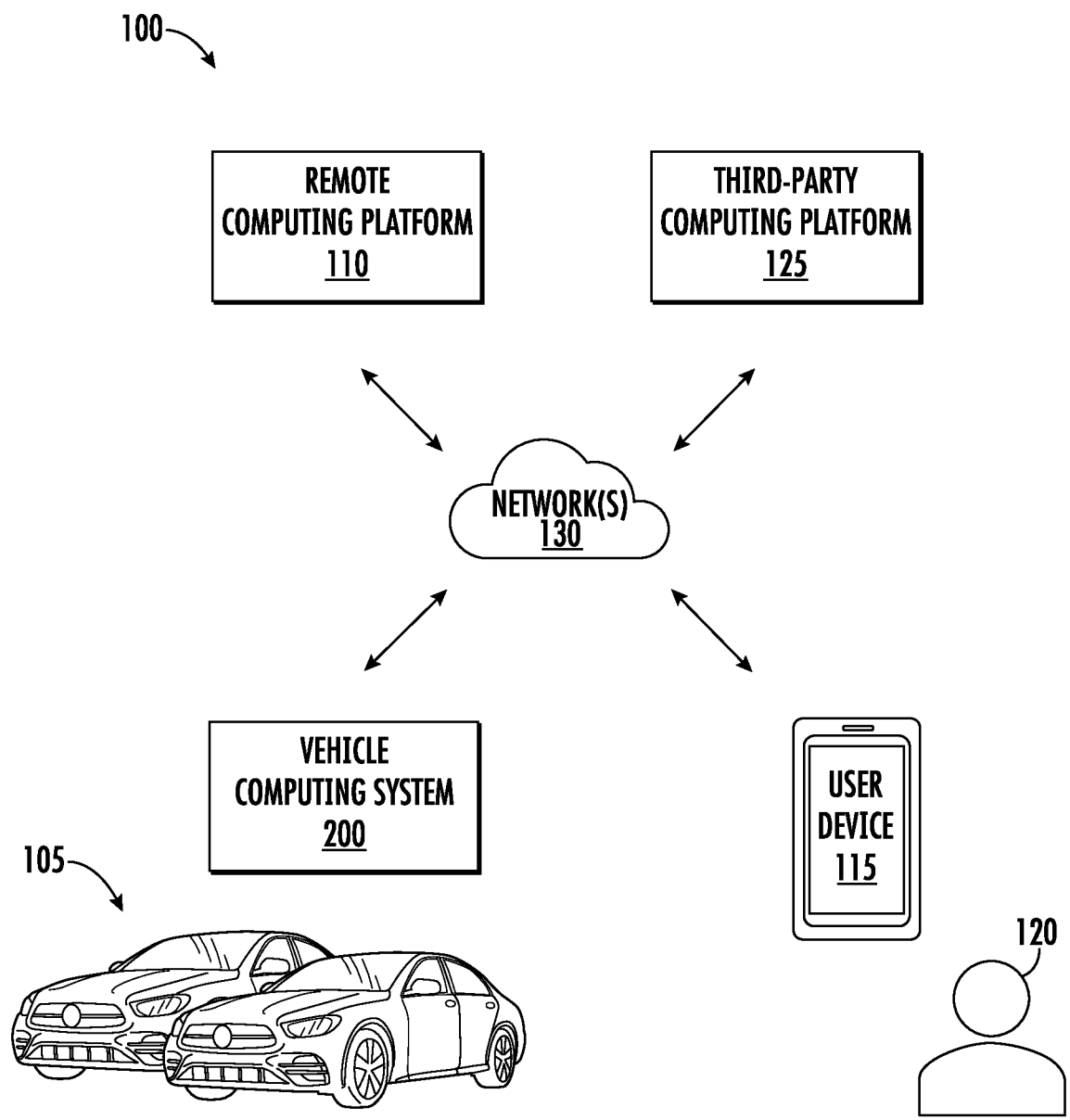
FIG. 1 illustrates an example computing ecosystem according to example embodiments of the disclosure.

Aspects of the disclosure relate to methods and computing systems relating to the transmission of OTA software updates over a network (e.g., cellular network) together with reaction operations which correspond to computing operations that are performed in response to a task state transition which occurs during the processing of a task that is associated with the OTA software update.

In some instances, if an additional workflow operation is to be added to an OTA update workflow (e.g., notifying a user about an update), a new task state could be introduced to the OTA workflow and task state machine (such as adding the task state "STAGED_NOTIFY" after a "STAGED" task state), and the computing system would be configured to perform a notification operation in response to a task state reaching the "STAGED_NOTIFY" state. However, this approach dramatically increases the complexity (e.g., increased usage of computing resources) of the computing system as new workflow operations (task states) are added to the task. Further, multiple versions would need to be supported for tasks which need a notification operation and for tasks which do not need the notification operation. If another workflow operation is added to the task, then four versions would need to be supported, and so on. In contrast to this approach, according to examples of the disclosure reaction operations are performed as a "side-effect" when a first task state changes or transitions to a second task state.

For example, a computing system (e.g., a cloud-based computing platform) may include a control circuit configured to obtain an OTA vehicle software update for a plurality of vehicles and determine a task for a first vehicle among the plurality of vehicles based on the OTA vehicle software update. The task may be associated with a plurality of task states. The control circuit may further be configured to determine, while processing the task with respect to the first vehicle, that the task has experienced a task state transition from a first task state among the plurality of task states to a second task state among the plurality of task states. In response to the task state transition, the control circuit may select a reaction operation from a plurality of reaction operations. The reaction operation may include a computing operation that is to be performed in response to the task state transition. The control circuit may further be configured to process the reaction operation independently from the vehicle performing the task.

The reaction operation may not be defined or included as a task state or part of the task state machine. Instead, the reaction operation can be defined with respect to or in association with an action of a rule that is referenced at the time of the task state transition.

According to some embodiments, reaction operations correspond to side-effects of a task state transition, without getting in the way of the task workflow implemented to successfully complete an OTA software update. Because the reaction operations are mere side-effects of the general OTA workflow and are decoupled from the general OTA workflow, the general OTA workflow remains efficient and stable. For example, reaction operations may be logically and temporally decoupled from the underlying task state transition by way of an indirect queueing mechanism for reaction processing as triggered by task state changes. That is, reaction operations may be stored in a reaction queue or other storage device and may be processed in an asynchronous manner with respect to the processing of the task.

In an embodiment, the computing system may process reaction operations in response to a change in the state of the task for a connection task (e.g., for a connection action for a vehicle connecting to backend system).

In some implementations, the reaction operation may include: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, (d) waking up a network device (e.g., a gateway) associated with the first vehicle (e.g., associated with a vehicle identification number), combinations thereof, and the like.

The technology of the disclosure provides a number of computing improvements and technical effects. For example, the technology of the disclosure can improve the efficiency of the computing resources by reducing the complexity of an OTA workflow, reducing the number of versions of workflows, and increasing the stability of an OTA workflow. For example, the reaction operations described herein are performed independently (e.g., in a logically and temporally decoupled manner) of workflow operations of an OTA software update workflow. For example, in a first approach by which an OTA update workflow also involves notifying a user (e.g., a customer), a new task state could be introduced, such as "STAGED_NOTIFY" after "STAGED", and the computing system would be configured to perform a notification operation in response to a task state reaching the "STAGED_NOTIFY" state. However, this approach would dramatically increase the complexity (e.g., increased usage of computing resources) of the computing system as new workflow operations (task states) are added to the task. Further, multiple versions would need to be supported for tasks which need a notification operation and for tasks which do not need the notification operation. If another workflow operation is added to the task, then four versions would need to be supported, and so on. In contrast to the first approach, according to examples of the disclosure reaction operations are performed as a "side-effect" when a first task state changes or transitions to a second task state. The described reaction operations do not interfere with the task state transition itself. For example, the reaction operations are logically and temporally decoupled from the underlying task state transition by way of an indirect queueing mechanism for reaction processing as triggered by task state changes, as described herein.

The technology of the disclosure may also improve computing technology for distributing tasks and with operations that may be associated with those tasks and may improve the performance of the computers of the task recipients such as vehicles and of computing systems which transmit the tasks such as service providers or cloud-based computing platforms (e.g., manufacturers or other entities responsible for providing or managing software updates). For example, a computing system (e.g., a cloud-based computing platform) may include a control circuit configured to obtain an OTA vehicle software update for a plurality of vehicles and determine a task for a first vehicle among the plurality of vehicles based on the OTA vehicle software update, wherein the task is associated with a plurality of task states. The control circuit may further be configured to determine, while processing the task with respect to the first vehicle, that the task has experienced a task state transition from a first task state among the plurality of task states to a second task state among the plurality of task states and in response to the task state transition, select a reaction operation from a plurality of reaction operations, wherein the reaction operation includes a computing operation that is to be performed in response to the task state transition. The control circuit may further be configured to process the reaction operation independently from the vehicle performing the task. In this way, the computing system may improve the efficiency and frequency with which download tasks (e.g., OTA updates) are successfully delivered to a vehicle while also enabling the computing system to process reaction operations in an independent and efficient manner. This can reduce computational waste or added complexity associated with performing operations by adding task states as described above. This can lead to an improved usage of the system's (and the network's) computing resources.

In accordance with the examples disclosed herein, the computing system onboard the vehicle may be more likely to receive updates and remain more up-to-date by avoiding adding task states to an OTA workflow which can increase the complexity of the OTA workflow and likelihood of errors occurring during processing of the task.

Reference now will be made in detail to embodiments, one or more examples of which are illustrated in the drawings. Each example is provided by way of explanation of the embodiments, not limitation of the disclosure. In fact, it will be apparent to those skilled in the art that various modifications and variations may be made to the embodiments without departing from the scope or spirit of the disclosure. For instance, features illustrated or described as part of one embodiment may be used with another embodiment to yield a still further embodiment. Thus, it is intended that aspects of the disclosure cover such modifications and variations.

The technology of the disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Although some of the techniques described herein describe utilizing a modern vehicle as a client device receiving the OTA updates, the techniques can be performed by any computing device that is connected to a network and can communicate with other devices, collect data, exchange data, and perform various functions without requiring human intervention. These devices can range from simple sensors that measure temperature or humidity to more complex devices such as home automation systems, smart appliances, industrial machinery, and modern vehicles.

FIG. 1 illustrates an example computing ecosystem 100 according to example embodiments of the disclosure. The ecosystem 100 may include a vehicle 105, a remote computing platform 110 (e.g., a computing system which may also be referred to herein as computing platform 110), and a user device 115 associated with a user 120. The user 120 may be a driver or passenger of the vehicle. In some implementations, the user 120 may be a passenger of the vehicle. In some implementations, the computing ecosystem 100 may include a third-party computing platform 125, as further described herein. The vehicle 105 may include a vehicle computing system 200 located onboard the vehicle 105. The computing platform 110, the user device 115, the third-party computing platform 125, and/or the vehicle computing system 200 may be configured to communicate with one another via one or more networks 130.

The systems/devices of computing ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. A further description of the computing hardware and components of computing platform 110 is provided herein with reference to other drawings.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing platform 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium, which may be external to the vehicle computing system 200, may act as an external buffer or repository for storing information. In such an example, the vehicle computing system 200 may retrieve or otherwise receive the information from the non-transitory computer-readable medium.

Certain routine and known components of vehicle 105 (e.g., an engine) are not illustrated and/or discussed herein for the purpose of brevity. One of the ordinary skills in the art will understand the operation of known vehicle components in vehicle 105.

The vehicle 105 may include a vehicle computing system 200. As described herein, the vehicle computing system 200 may be onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
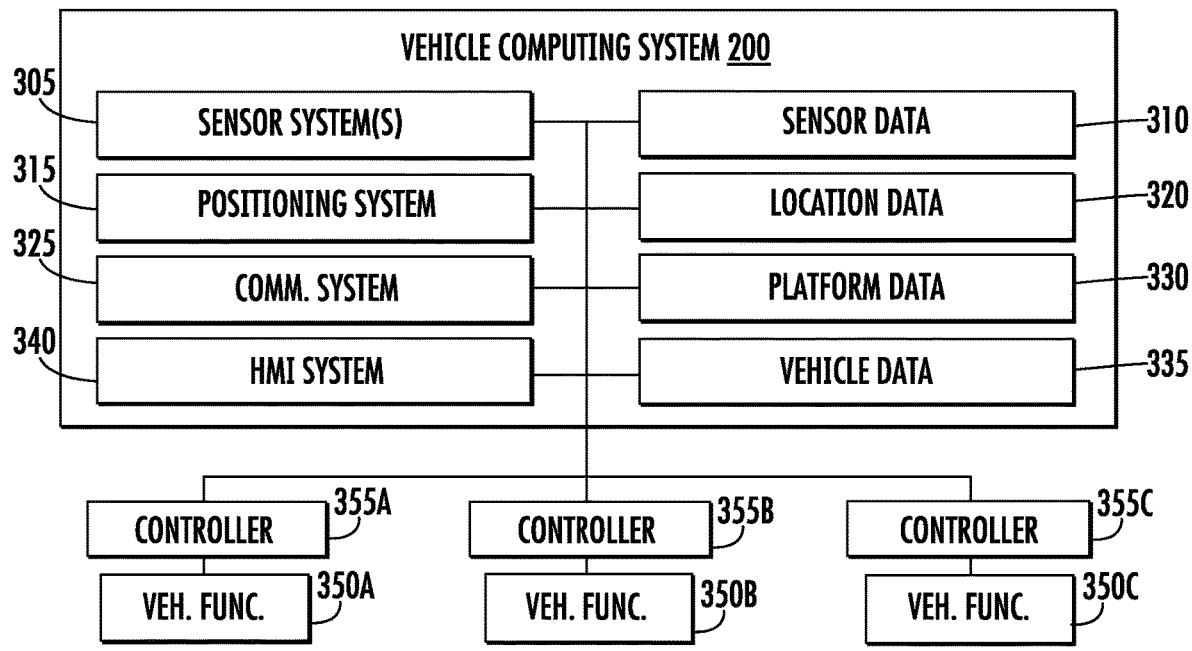
FIG. 2A illustrates an overview of a vehicle computing system, according to example embodiments of the disclosure.

FIG. 2A illustrates an overview of a vehicle computing system 200, according to example embodiments of the disclosure.

The vehicle 105 may include one or more sensor systems 305. A sensor system may include or otherwise be in communication with a sensor of the vehicle 105 and a module for processing sensor data 310 associated with the sensor configured to acquire the sensor data 310. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 310 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 315 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communication system 325 configured to allow the vehicle 105 (and its vehicle computing system 200) to communicate with other computing devices. The vehicle computing system 200 may use the communication system 325 to communicate with the remote computing platform 110 or one or more other remote computing devices over a network 130 (e.g., via one or more wireless signal connections). For example, the vehicle computing system 200 may utilize the communication system 325 to receive platform data 330 from the computing platform 110. This may include, for example, an over-the-air (OTA) software update for the operating system of the vehicle computing system 200. Additionally, or alternatively, the vehicle computing system 200 may utilize the communication system 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communication system 325 may allow communication among one or more of the systems on-board the vehicle 105.

In an embodiment, the communication system 325 may be configured to allow the vehicle 105 to communicate with or otherwise receive data from the user device 115 (shown in FIG. 1). The communication system 325 may utilize various communication technologies such as, for example, Bluetooth low energy protocol, radio frequency signaling, or other short range or near field communication technologies. The communication system 325 may include any suitable components for interfacing with one or more networks, including, for example, transmitters, receivers, ports, controllers, antennas, or other suitable components that may help facilitate communication.

The vehicle 105 may include one or more human-machine interface systems 340. The human-machine interface systems 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interface systems 340 may present content (e.g., vehicle speed, mileage, fuel level, charge range, navigation/routing information, audio selections, streaming content, internet search results, comfort or climate settings, etc.) based on the various data (e.g., sensor data 310, location data 320, platform data 330, vehicle data 335, etc.) via a user interface for display to a user 120.

The vehicle 105 may include a plurality of vehicle functions 350A, 350B, 350C. A vehicle function 350A, 350B, 350C may be a functionality that the vehicle 105 is configured to perform based on a detected input. The vehicle functions 350A, 350B, 350C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with one or more of the vehicle functions 350A, 350B, 350C through a user input that specifies a setting of one or more of the vehicle functions 350A, 350B, 350C selected by the user.

Each vehicle function may be associated with one or more of the controllers 355A, 355B, 355C. The controllers 355A, 355B, 355C for a particular vehicle function may include control circuitry configured to operate its associated vehicle function. For example, a controller may include circuitry configured to turn the seat heating function on, to turn the seat heating function off, set a particular temperature or temperature level, etc.

In an embodiment, a controller for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A, 355B, 355C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be transmitted to the computing platform 110.

Figure 2B:
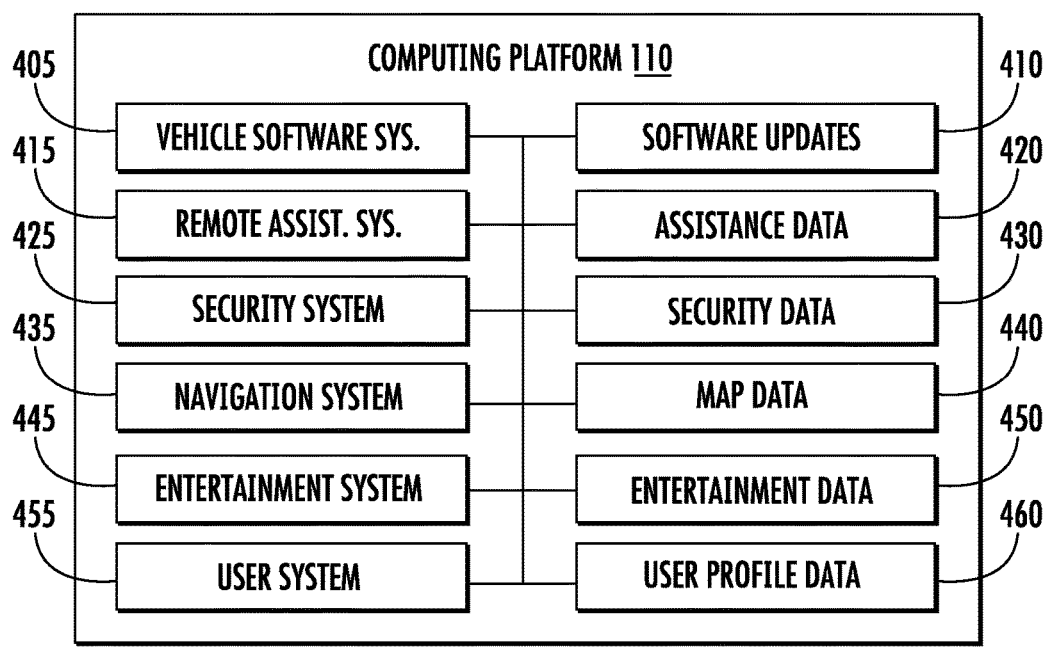
FIG. 2B illustrates an overview of a computing platform, which is remote from a vehicle, according to example embodiments of the disclosure.

FIG. 2B illustrates an overview of a computing platform 110, which is remote from a vehicle, according to example embodiments of the disclosure. As described herein, the computing platform 110 may include a cloud-based computing platform. The computing platform 110 may be implemented on one or more servers and include, or otherwise have access to, one or more databases. In an example, the computing platform 110 may be implemented using different servers based on a geographic region.

In some implementations, the computing platform 110 may include a layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110.

In an example, the computing platform 110 may include a vehicle software system 405 that is configured to provide the vehicle 105 with one or more OTA software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle software system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and OTA updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 105, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, preferences for frequency or time of OTA vehicle software updates, etc. The user profile data 460 may be updated based on information periodically provided by the vehicle 105. In some implementations, the user profile data 460 may be provided to the user device 115.

The technology of the disclosure allows a computing system (e.g., computing platform 110, third-party computing platform 125, etc.) to perform OTA updates (e.g., OTA vehicle software updates) for vehicle computing system 200 in conjunction with processing a reaction operation. More particularly, the computing system (e.g., computing platform 110, third-party computing platform 125, etc.) may be configured to implement a predefined task state machine to process tasks associated with an OTA workflow. For example, the task state machine can be implemented using a variety of tools and frameworks, including state machine libraries, workflow engines, and the like. In response to a task state transition (e.g., transitioning from a first task state among a plurality of task states to a second task state among the plurality of task states), the computing system (e.g., computing platform 110, third-party computing platform 125, etc.) may be configured to select a reaction operation from a plurality of reaction operations, wherein the reaction operation includes a computing operation that is to be performed in response to the task state transition. Further, the computing system (e.g., computing platform 110, third-party computing platform 125, etc.) may be configured to process the reaction operation independently from the vehicle 105 (vehicle computing system 200) performing the task.

Tasks may be fundamental building blocks for OTA updates. A task, for example, may be an instance of an OTA-related action as it applies to a given vehicle while a rule may be defined with respect to a group or a class of vehicles. For example, if a rule is defined as "cars in set X need to perform action A" where A is the action "upgrade from 2.1 to 2.2" then a task may be defined as "car C needs to upgrade from 2.1 to 2.2" where C is in set X.

Tasks may include a lifecycle, following a predefined task state machine. For example, when a computing system prepares an action such that it is ready to be transmitted to a vehicle, the task may be considered "STAGED." When the task is transmitted to the vehicle, the task state may be changed from "STAGED" to "PENDING." When the vehicle reports success or failure in executing that task, the state of the task may transition to "SUCCEEDED" or "FAILED," respectively. A task state machine may include a plurality of states, transitions, and actions that define the behavior of the task. Each state may represent a stage in the lifecycle of the task and may include labels other than those described above, such as "created", "in progress", "completed", or "cancelled". Transitions may define the conditions and triggers that cause the task to move from one state to another, such as the completion of a task or the occurrence of an event. A reaction operation as described herein may include operations that are performed or processed in response to a transition, including sending notifications, updating records, or invoking external services.

Figure 3:
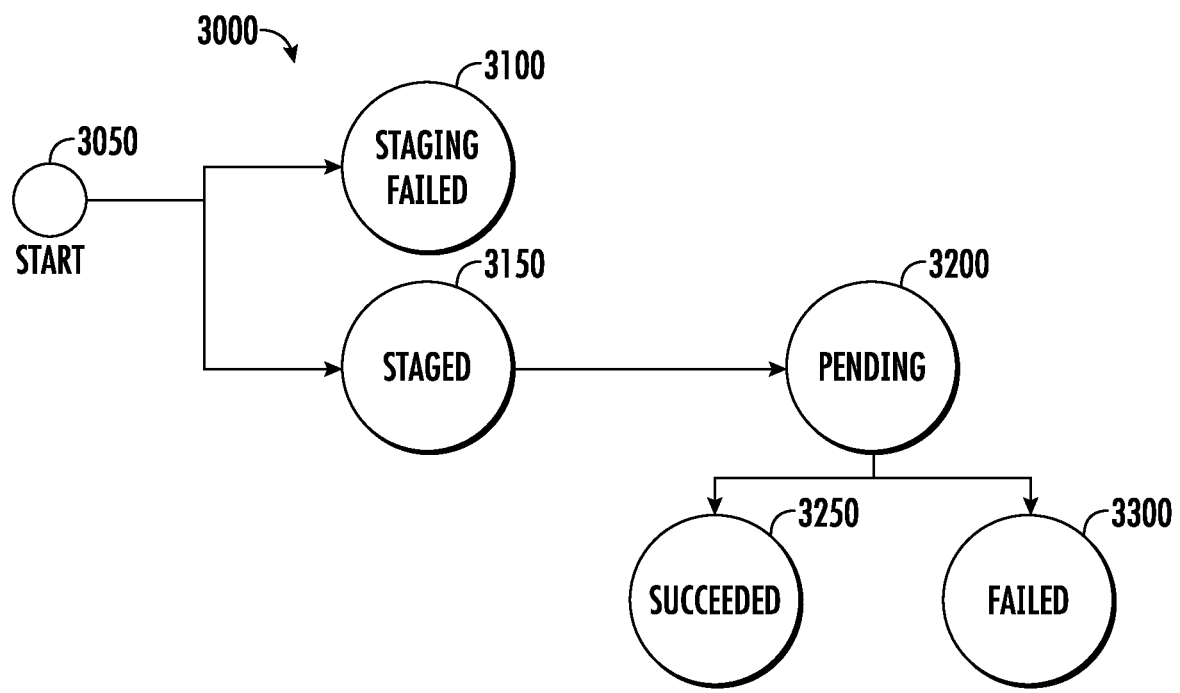
FIG. 3 illustrates an example task state machine illustrating example states of a task, according to example embodiments of the disclosure.

FIG. 3 illustrates an example task state machine 3000 illustrating example states of a task, according to example embodiments of the disclosure. At the start 3050 of the task state machine 3000 a computing system (e.g., computing platform 110, third-party computing platform 125, etc.) determines whether task staging is successful or has failed.

For example, task staging may include operations of preparing and setting up an environment for the OTA software update task which indicate that the task is ready to be transmitted (e.g., to the vehicle 105). Task staging may include performing various checks, validations, and configurations before performing the update. For example, task staging may include the computing system (e.g., computing platform 110, third-party computing platform 125, etc.) determining or verifying that the vehicle computing system 200 is ready or capable of receiving the update (e.g., by verifying available storage space, battery level, network connectivity, etc.). For example, task staging may include the computing system (e.g., computing platform 110, third-party computing platform 125, etc.) downloading or receiving the update package, containing the new/updated firmware or software, from a remote server or source. This may include the computing system (e.g., computing platform 110, third-party computing platform 125, etc.) establishing a secure connection, verifying the integrity of the update package, and ensuring sufficient network bandwidth for the download. For example, task staging may include the computing system (e.g., computing platform 110, third-party computing platform 125, etc.) validating the downloaded update package to ensure its authenticity and integrity (e.g., by checking digital signatures, hash values, or other checksum mechanisms). For example, when the update package is compressed or archived, task staging may include the computing system (e.g., computing platform 110, third-party computing platform 125, etc.) decompressing and extracting firmware or software files. For example, task staging may include the computing system (e.g., computing platform 110, third-party computing platform 125, etc.) performing compatibility checks to ensure that the update package is applicable to the vehicle computing system 200 (e.g., by checking hardware and software version requirements, system dependencies, and other compatibility factors).

When task staging has failed the task state machine 3000 may transition to a "STAGING FAILED" state 3100 and the computing system (e.g., computing platform 110, third-party computing platform 125, etc.) may need to take various corrective actions (e.g., download the update package again, obtain a different version of the update package, etc.) to ensure that the task is ready to be transmitted.

When task staging has succeeded the task state machine 3000 may transition to a "STAGED" state 3150 and the computing system (e.g., computing platform 110, third-party computing platform 125, etc.) may then continue to process the task via the task state machine 3000 by proceeding to a "PENDING" state 3200.

For example, the "PENDING" state 3200 may refer to a state of a task that has been staged and is awaiting further action or confirmation before it can proceed to the next stage. The "PENDING" state 3200 may indicate the task has been transmitted to the vehicle 105 (e.g., vehicle computing system 200), but that execution of the task has not been completed or that a report of whether the execution of the task has successfully been completed or has failed, has not been received. The "PENDING" state 3200 may also indicate the task is ready to be executed but requires additional authorization or validation. For example, the computing system (e.g., computing platform 110, third-party computing platform 125, etc.) may need to receive additional authorization or confirmation from an authorized entity before proceeding with (e.g., transmitting) the actual update. The authorization may include receiving a user input (e.g., user consent or action), administrative approval, or validation from a central server. The user input may include approval for the vehicle computing system 200 to receive the update package, an input indicating a suitable time for installation, etc.

The "PENDING" state 3200 may also include the computing system (e.g., computing platform 110, third-party computing platform 125, etc.) waiting for an appropriate time to perform (or transmit) the task. For example, in the "PENDING" state 3200 the computing system (e.g., computing platform 110, third-party computing platform 125, etc.) may deconflict with other tasks (e.g., updates) which are being performed with respect to the vehicle computing system 200 or may wait for other tasks (e.g., updates) to be completed which may need to be performed (e.g., as a prerequisite) prior to the update package being installed. For example, if a given vehicle does not have the ability to process multiple updates concurrently, then the task state machine 3000 may remain in the "PENDING" state 3200 in order to ensure that instructions are not sent for concurrent updates. For example, in the "PENDING" state 3200 the computing system (e.g., computing platform 110, third-party computing platform 125, etc.) may perform additional checks to ensure that the update package can be installed by revalidating network connectivity, vehicle computing system 200 readiness, or any specific requirements for the update process.

Once the necessary authorization, user interaction, or external dependencies are resolved, the task state machine can transition from the "PENDING" state 3200 to a "SUCCEEDED" state 3250 when the task (e.g., the update package) is successfully executed (e.g., installed) or a "FAILED" state 3300 when the task (e.g., the update package) is not successfully executed (e.g., not installed). For example, the vehicle 105 (e.g., vehicle computing system 200) may be configured to report to the computing system (e.g., computing platform 110, third-party computing platform 125, etc.) success in executing the task and the task state moves to the "SUCCEEDED" state 3250 or failure in executing the task and the task state moves to the "FAILED" state 3300. For example, when a task transitions to a "SUCCEEDED" state 3250 the computing system (e.g., computing platform 110, third-party computing platform 125, etc.) may be configured to an update a separate computing system responsible for tracking what software versions are in each vehicle.

Figure 4:
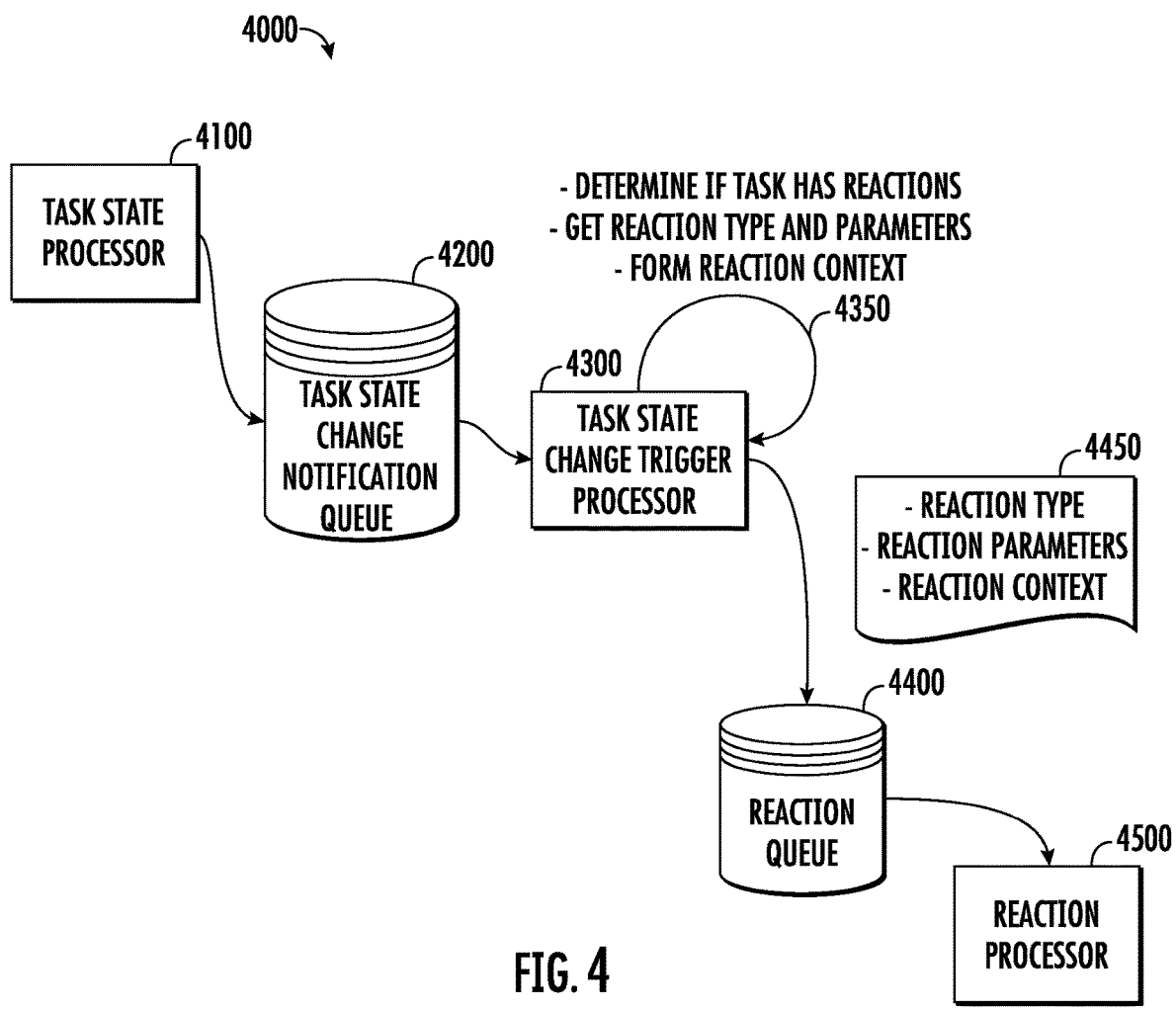
FIG. 4 illustrates an example overview diagram for processing a reaction operation while processing a task, according to example embodiments of the disclosure.

FIG. 4 illustrates an example overview diagram for processing a reaction operation while processing a task, according to example embodiments of the disclosure.

In FIG. 4 the reaction processing overview 4000 depicts a flow of operations involving a task state processor 4100, task stage change trigger processor 4300, and reaction processor 4500. Each of the task state processor 4100, task stage change trigger processor 4300, and reaction processor 4500 may represent or correspond to software components or modules of an application or program of a computing system (e.g., computing platform 110, third-party computing platform 125, etc.) that processes operations relating to a task. For example, task state processor 4100 may include a component or module that is configured to process or manage the state changes of tasks processed by the computing system (e.g., computing platform 110, third-party computing platform 125, etc.). The task state processor 4100 may be configured to receive notifications or events when the state of a task changes, such as when a task is staged, when a task is pending, or when completion of a task succeeds or fails. The task state processor 4100 may be configured to update the state of the task, perform any necessary actions or validations based on the state change, and trigger subsequent processes or components in response to a state change of a task.

For example, task state change notification queue 4200 may receive information from the task state processor 4100 indicating a state change of a task. The task state change notification queue 4200 may include a message queue or a queue-like data structure that is used to store and manage notifications or events related to task state changes. When a state of a task changes, a notification or event may be generated (e.g., by task state processor 4100) and the notification or event may be stored at the task state change notification queue 4200. The task state processor 4100 or task stage change trigger processor 4300 may be configured to process the notifications from the task state change notification queue 4200 to process and handle the task state changes.

For example, task stage change trigger processor 4300 may include a component or module that is configured to trigger actions or processes in response to a change in state of a task. The task stage change trigger processor 4300 may be configured to listen for (receive) task stage change events or notifications, which could indicate the completion of a specific phase or step within a task. For example, at 4350 in response to a task stage change event being received, the task stage change trigger processor 4300 may be configured to determine if the task has one or more reaction operations associated with the task, determine or obtain the type of each reaction operation, select one or more reaction operations, determine context and parameter information associated with each reaction operation, and form a reaction context for each reaction operation.

The reaction queue 4400 may be configured to store information about the reaction operations. For example, the reaction queue 4400 may include a message queue or data structure configured to store and manage reaction operations or responses to specific events or triggers in the computing system (e.g., computing platform 110, third-party computing platform 125, etc.), in response to a change in state of a task. Storage of the reaction operations (or of information about the reaction operations) at the reaction queue 4400 enables for the decoupling of the task from the reaction operations including enabling asynchronous processing of the task and the reaction operations. For example, when an event or trigger occurs such as a change in state of a task, a corresponding reaction operation may be determined and stored at the reaction queue 4400 for further processing. For example, as indicated by 4450, information including reaction type, reaction parameters, and reaction context may be stored together with or separately from the corresponding reaction operation in the reaction queue 4400.

The reaction processor 4500 may include a component or module configured to process reaction operations from the reaction queue 4400. For example, the reaction processor 4500 may be configured to listen for (receive) reaction operations that are stored at the reaction queue 4400, dequeue the reaction operations from the reaction queue 4400, and perform various actions or operations associated with each reaction operation. The reaction processor 4500 may be configured to handle and process reaction operations in a decoupled and asynchronous manner with respect to the task.

The flow of operations described with respect to the reaction processing overview 4000 of FIG. 4 normalizes disparate types of reaction operations (including notifications, vehicle property updates, and virtually any other software-driven side-effect) in a single framework. This provides the benefit of decoupling task state changes from reaction types, allowing the computing system (e.g., computing platform 110, third-party computing platform 125, etc.) to mix and match a potentially open-ended set of reaction operations with well-defined task state transitions without requiring numerous versions of task state machines and while ensuring a stable OTA workflow. To further minimize impact on the OTA workflow and task state machine, information about any reaction operation to be performed is not persisted with the task itself, but is instead retrieved from a rule action definition at the time of processing a notification that a task state change has occurred. For example, information about the reaction operation can be retrieved at a time when a first task state transitions to a second task state. Further details regarding the flow of operations described with respect to the reaction processing overview 4000 of FIG. 4 are described with respect to FIGS. 5A to 5C.

Figure 5A:
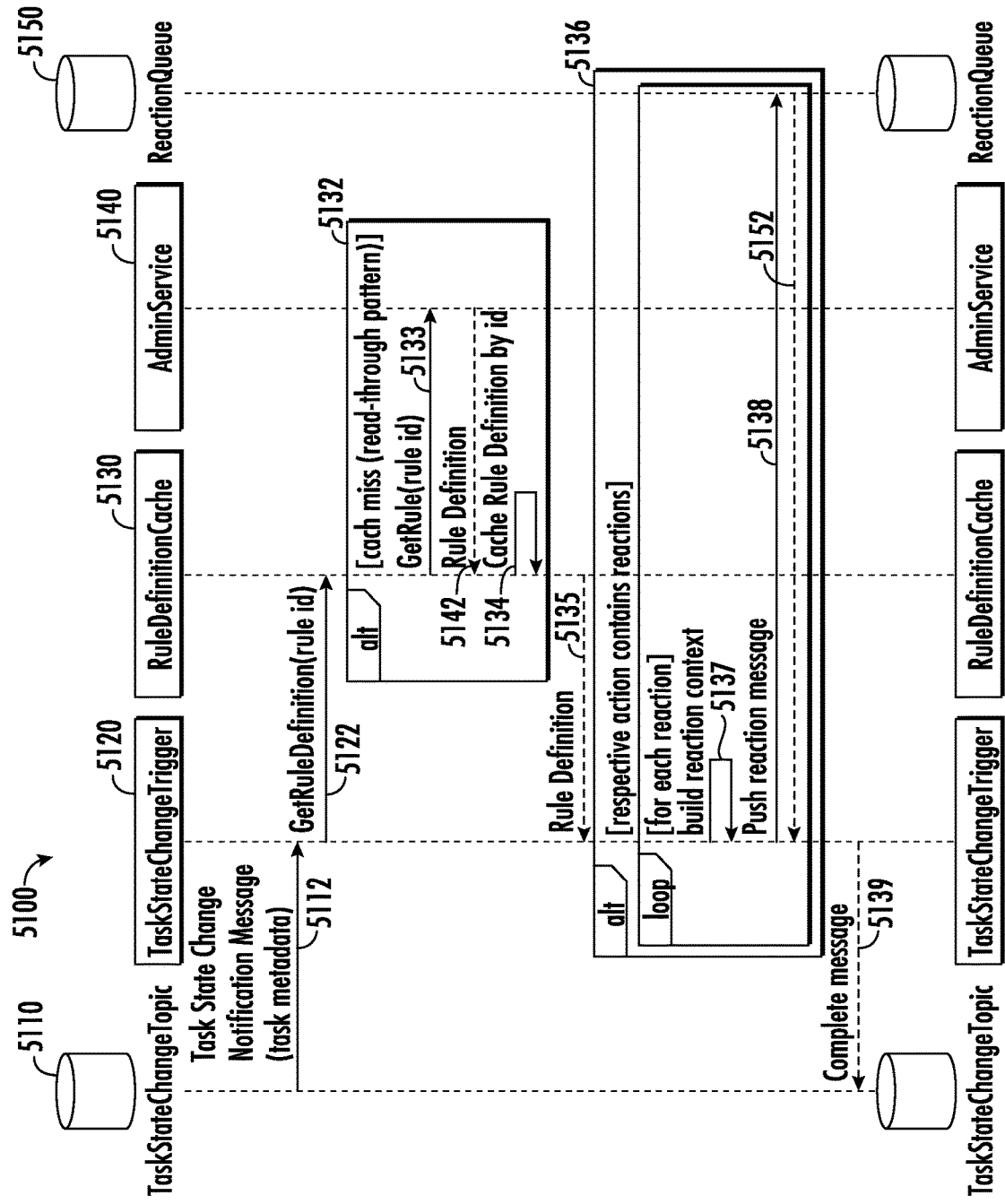
FIG. 5A illustrates an example overview diagram for processing a task state change operation while processing a task, according to example embodiments of the disclosure.
Figure 5B:
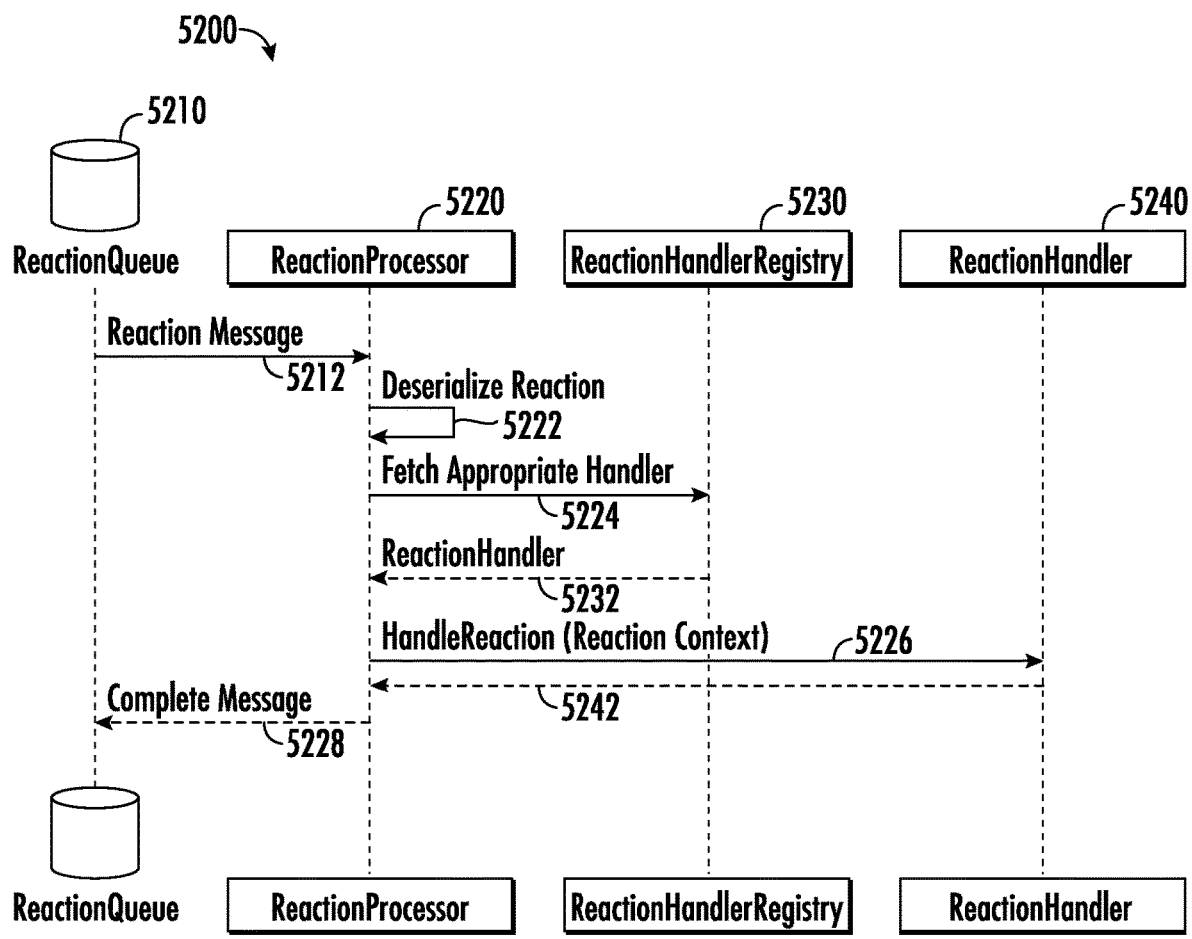
FIG. 5B illustrates an example overview diagram for a reaction queue processing operation while processing a task, according to example embodiments of the disclosure.
Figure 5C:
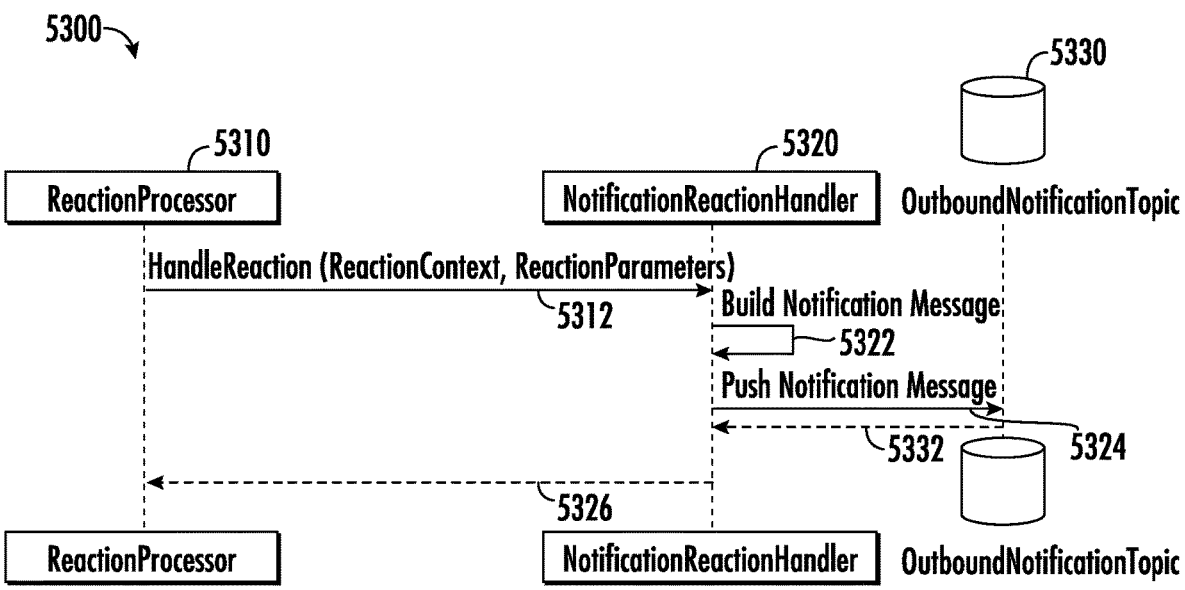
FIG. 5C illustrates an example overview diagram for a notification reaction handler operation while processing a task, according to example embodiments of the disclosure.

FIG. 5A illustrates an example overview diagram for processing a task state change operation while processing a task, according to example embodiments of the disclosure. FIG. 5B illustrates an example overview diagram for a reaction queue processing operation while processing a task, according to example embodiments of the disclosure. FIG. 5C illustrates an example overview diagram for a notification reaction handler operation while processing a task, according to example embodiments of the disclosure.

Each of the components illustrated in FIGS. 4 and 5A to 5C (e.g., task state processor 4100, task state change notification queue 4200, task stage change trigger processor 4300, reaction queue 4400, reaction processor 4500, task state change topic 5110, task state change trigger 5120, rule definition cache 5130, admin service 5140, reaction queue 5150, reaction queue 5210, reaction processor 5220, reaction handler registry 5230, reaction handler 5240, reaction processor 5310, notification reaction handler 5320) may be included at the computing system (e.g., computing platform 110, third-party computing platform 125, etc.), for example, as software components of a program or application, or as a database or storage device (e.g., task state change notification queue 4200, reaction queue 4400, rule definition cache 5130, reaction queue 5150, reaction queue 5210, reaction handler registry 5230). Operations and functions of these components as described herein may be implemented by one or more control circuits described herein (e.g., control circuit 715, control circuit 1015, control circuit 1115, etc.) and via computer-readable code or instructions which may be stored one or more storage devices described herein (e.g., non-transitory computer-readable medium 720, non-transitory computer-readable medium 1020, non-transitory computer-readable medium 1120, etc.).

In FIG. 5A, the example task state change overview 5100 illustrates that in response to a notification of a task stage change from task state change topic 5110, a message is sent to reaction queue 5150. In more detail, in response to the state of a task changing (e.g., from "STAGED" to "PENDING"), the task state change topic 5110 may transmit a task state change notification message 5112 to task state change trigger 5120 (e.g., corresponding to task stage change trigger processor 4300 of FIG. 4). In response to receiving the task state change notification message 5112, at operation 5122 the task state change trigger 5120 may be configured to obtain a rule definition from rule definition cache 5130.

Rule definition cache 5130 may be a component configured to store and manage rules or conditions associated with task state changes. For example, the rule definition may be obtained directly from the rule definition cache 5130 based on an identifier associated with the rule definition. Box 5132 indicates alternative operations when the rule definition is not present in rule definition cache 5130. For example, at 5133 the rule definition cache 5130 may be configured to obtain or request the rule definition from admin service 5140; at 5142 admin service 5140 may be configured to transmit the rule definition to rule definition cache 5130; and at 5134 the rule definition cache 5130 may be configured to cache the rule definition according to an identifier associated with the rule definition. Thereafter, at 5135 rule definition cache 5130 may be configured to transmit the rule definition to task state change trigger 5120.

Box 5136 indicates operations which occur in response to the task state change trigger 5120 receiving the rule definition. For example, a rule definition may include reaction operations which are associated with actions from the rule definition. That is, the reaction operation is associated with an action of a rule. The task state change trigger 5120 may be configured to determine whether a respective action from the rule definition is associated with (contains) one or more reaction operations. At operation 5137 the task state change trigger 5120 may be configured to build a reaction context associated with a reaction operation based on the rule definition and transmit (push) a reaction message to reaction queue 5150 (corresponding to reaction queue 4400 of FIG. 4) at operation 5138. The reaction message may include information about the type of the reaction operation, associated data, and any other additional context information needed for processing the reaction operation.

Pushing the reaction message to the reaction queue 5150 enables the computing system (e.g., computing platform 110, third-party computing platform 125, etc.) to decouple the reaction processing from the rule evaluation process associated with the task. By using a queue, the computing system (e.g., computing platform 110, third-party computing platform 125, etc.) can handle reaction operations asynchronously and in a more scalable manner. For example, the reaction processor 4500 of FIG. 4 may be configured to listen to the reaction queue 5150 and process reaction operations at an appropriate time, independently of the task being performed. As illustrated in FIG. 5A, at operation 5152 the reaction queue 5150 may be configured to transmit the reaction message to task state change trigger 5120 and the reaction message may be transmitted to task state change topic 5110 at operation 5139.

In FIG. 5B, the example reaction queue processing overview 5200 illustrates that in response to the reaction message being generated and stored at the reaction queue 5210, a proper reaction handler 5240 can be determined for processing the reaction operation. For example, reaction messages are processed by reaction processor 5220 from the reaction queue 5210 by inspecting the reaction message and determining the proper reaction handler 5240 for this type of message. Context and parameters of the reaction operation are then dispatched by the reaction processor 5220 to this specific reaction handler 5240. In more detail, at operation 5212 the reaction processor 5220 (corresponding to reaction processor 4500 of FIG. 4) may be configured to listen for (receive) the reaction message from the reaction queue 5210 (corresponding to reaction queue 4400 of FIG. 4).

At operation 5222 the reaction processor 5220 may be configured to deserialize the reaction message or reaction operation included in the reaction message. For example, deserializing the reaction message or reaction operation may include converting the received reaction message or reaction operation from its serialized form into a structured or usable format. For example, deserialization may include extracting relevant data and reconstructing a reaction object from the serialized reaction message or reaction operation.

In response to the reaction message or reaction operation being deserialized, the reaction processor 5220 may be configured to fetch an appropriate handler for the reaction operation from reaction handler registry 5230 at operation 5224. The reaction handler registry 5230 may include a component (e.g., a database or other storage device) that stores or tracks available reaction handlers in the computing system (e.g., computing platform 110, third-party computing platform 125, etc.). The reaction handler registry 5230 may include a centralized repository or database for storing information about the registered reaction handlers. The reaction handler registry 5230 may be configured to maintain metadata associated with each reaction handler, such as its name, description, and input and output requirements. At operation 5232 the reaction handler registry 5230 may be configured to transmit information about the available reaction handlers to reaction processor 5220.

At operation 5226, the reaction processor 5220 may be configured to transmit the reaction message and its associated context and/or parameters (e.g., reaction operation information) to reaction handler 5240. The context may include relevant information or data needed for the reaction operation processing (e.g., input values, contextual details, or configuration settings required by the reaction handler 5240 to perform the requested reaction operations). At operation 5242 the reaction handler 5240 may be confirmed to confirm receipt and at operation 5228 the reaction processor 5220 may be configured to transmit a complete message to reaction queue 5210.

In FIG. 5C, the example notification reaction handler overview 5300 illustrates a type of reaction handler that sends notifications to external systems. For example, in response to receiving context and parameter information relating to a reaction operation from the reaction processor 5310, the notification reaction handler 5320 may be configured to transmit (push) a notification message to outbound notification topic 5330 (an external computing system).

In more detail, at operation 5312 the reaction processor 5310 (corresponding to reaction processor 4500 of FIG. 4 and reaction processor of 5220 of FIG. 5B) may be configured to transmit the reaction message and its associated context and/or parameters (e.g., reaction operation information) to notification reaction handler 5320. Here, notification reaction handler 5320 may correspond to the reaction handler deemed appropriate by reaction handler registry 5230 in FIG. 5B. At operation 5322 notification reaction handler 5320 may be configured to build a notification message and at operation 5324 transmit (push) the notification message to outbound notification topic 5330 (an external computing system). At operation 5332 the outbound notification topic 5330 may be configured to confirm receipt of the notification message and operation 5326 the notification reaction handler 5320 may be configured to confirm with the reaction processor 5310 that the outbound notification topic 5330 has received the notification message.

Figure 6:
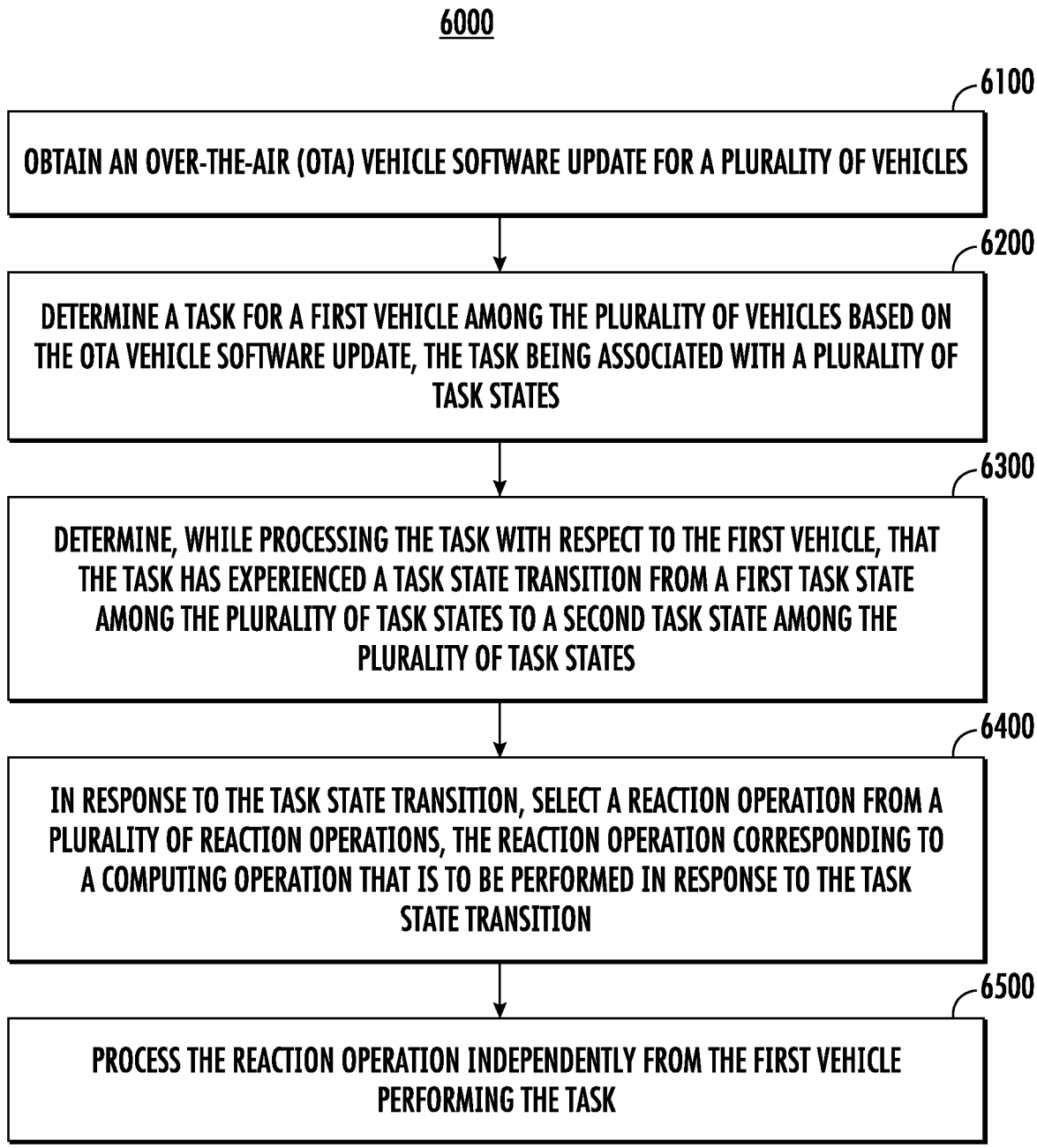
FIG. 6 illustrates a flowchart diagram of an example method 6000 for processing a task and reaction operation with respect to an over-the-air (OTA) vehicle software update, according to example embodiments of the disclosure.

FIG. 6 illustrates a flowchart diagram of an example method 6000 for processing a task and reaction operation with respect to an over-the-air (OTA) vehicle software update, according to example embodiments of the disclosure. The method 6000 may be performed by a computing system (e.g., the remote computing platform 110, the third-party computing platform 125, the user device 115, etc.) described with reference to the other drawings. In an embodiment, one or more operations of the method 6000 may be performed by the control circuit of the remote computing platform 110, the third-party computing platform 125, or the user device 115, of FIGS. 1 through 5C and/or 7. One or more portions of the method 6000 may be implemented as an algorithm on the hardware components of the devices described herein (e.g., as in FIGS. 1 through 5C and/or 7). For example, the operations of method 6000 may be implemented as operations/instructions that are executable by computing hardware.

FIG. 6 illustrates elements performed in a particular order for purposes of illustration and discussion. Those of ordinary skill in the art, using the disclosure provided herein, will understand that the elements of any of the methods discussed herein may be adapted, rearranged, expanded, omitted, combined, or modified in various ways without deviating from the scope of the disclosure. FIG. 6 is described with reference to elements/terms described with respect to other systems and drawings, for example illustrated purposes and is not meant to be limiting. One or more portions of method 6000 may be performed additionally, or alternatively, by other systems. For example, some aspects of method 6000 may be performed by a control circuit of the computing platform 110 while other aspects of method 6000 may be performed by third-party computing platform 125.

In an embodiment, the method 6000 may begin with or otherwise include an operation 6100, in which the computing system (e.g., the remote computing platform 110, the third-party computing platform 125, the user device 115, etc.) can obtain an over-the-air (OTA) vehicle software update for a plurality of vehicles. For example, the plurality of vehicles may belong to a same class of the vehicles. For example, the OTA vehicle software update may be received by remote computing platform 110 from the third-party computing platform 125.

The method 6000 in an embodiment may include an operation 6200, in which the computing system (e.g., the remote computing platform 110, the third-party computing platform 125, the user device 115, etc.) can determine a task for a first vehicle among the plurality of vehicles based on the OTA vehicle software update. For example, the task may be associated with a plurality of task states. As described herein, a task may correspond to an instance of an OTA-related action as it applies to a given vehicle while a rule may be defined with respect to a group or a class of vehicles. For example, action may include upgrading a software version (e.g., for upgrading a software version onboard a vehicle). As another example, if a rule is defined as "cars in set X need to perform action A" where A is the action "upgrade software version from 2.1 to 2.2" then a task may be defined as "car C needs to upgrade the software version from 2.1 to 2.2" where C is in set X. As another example, the task may correspond to or include a connection action of the first vehicle connecting to one or more computing systems via a network, and the connection action may be defined by associating a reaction operation with the connection action. For example, as discussed previously a task may include a lifecycle, following a predefined task state machine. The task state machine may include a plurality of states, transitions, and actions that define the behavior of the task. Each state may represent a stage in the lifecycle of the task and may include states including "STAGED", "STAGING FAILED", "PENDING", "SUCCEEDED", "FAILED", or labels other than those described above, including "created", "in progress", "completed", or "cancelled".

The method 6000 in an embodiment may include an operation 6300, in which the computing system (e.g., the remote computing platform 110, the third-party computing platform 125, the user device 115, etc.) can determine, while processing the task with respect to the first vehicle, that the task has experienced a task state transition from a first task state among the plurality of task states to a second task state among the plurality of task states. For example, as described with reference to FIG. 4 and FIG. 5A, task state processor 4100 may include a component or module that is configured to process or manage the state changes of tasks processed by the computing system (e.g., computing platform 110, third-party computing platform 125, etc.). For example, task state change notification queue 4200 may receive information from the task state processor 4100 indicating a state change of a task (e.g., from "PENDING" to "SUCCEEDED" or from "STAGED" to "PENDING" and so on).

The method 6000 in an embodiment may include an operation 6400, in which the computing system (e.g., the remote computing platform 110, the third-party computing platform 125, the user device 115, etc.) can, in response to the task state transition, select a reaction operation from a plurality of reaction operations, wherein the reaction operation includes a computing operation that is to be performed in response to the task state transition.

For example, as described with reference to FIG. 4 and FIG. 5A, task stage change trigger processor 4300 and task state change trigger 5120 may be configured to determine if the task has one or more reaction operations associated with the task (or more particularly with an action of a rule definition), determine or obtain the type of each reaction operation, select one or more reaction operations, determine context and parameter information associated with each reaction operation, and form a reaction context for each reaction operation. For example, the task stage change trigger processor 4300 and task state change trigger 5120 may be configured to retrieve information about the reaction operation at a time when the first task state transitions to the second task state (e.g., at a time of processing a notification that a task state change has occurred). For example, task stage change trigger processor 4300 and task state change trigger 5120 may be configured to select a reaction operation from a plurality of reaction operations by identifying the reaction operation based on an action associated with the task (e.g., as described with reference to operations 5135 through 5138 of FIG. 5A).

As described herein, the computing system (e.g., computing platform 110, third-party computing platform 125, etc.) may be configured to determine an action to be performed for a class of vehicles and associate the reaction operation with the action. Generally, when a task changes state to state S (where S can be any task state), a reaction operation R may be performed, where R can be selected from a plurality of available reactions.

For example, the reaction operation may include at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device (e.g., a gateway) associated with the first vehicle (e.g., associated with a vehicle identification number).

The method 6000 in an embodiment may include an operation 6500, the computing system (e.g., computing platform 110, third-party computing platform 125, etc.) may be configured to process the reaction operation independently from the first vehicle performing the task. For example, the reaction operation may be logically and temporally decoupled from the task state transition of the first task state to the second task state.

As described herein, the computing system (e.g., computing platform 110, third-party computing platform 125, etc.) is configured to process reaction operations in a way that does not interfere with (and is isolated from) the main OTA workflow as defined by the task state machine. In other words, the reaction operations correspond to side-effects of a task state transition, without getting in the way of the task workflow implemented to successfully complete an OTA software update. Because the reaction operations are mere side-effects of the general OTA workflow and are decoupled from the general OTA workflow, the general OTA workflow remains efficient and stable. For example, reaction operations may be logically and temporally decoupled from the underlying task state transition by way of an indirect queueing mechanism for reaction processing as triggered by task state changes. For example, the reaction queue 4400 may include a message queue or data structure configured to store and manage reaction operations. For example, queuing the reaction operation enables for the decoupling of the task from the reaction operations and also enables asynchronous processing of the task by the vehicle with respect to the processing of the reaction operation.

Processing of the reaction operation may further include the computing system (e.g., computing platform 110, third-party computing platform 125, etc.) determining an appropriate reaction handler to handle the reaction operation as described with reference to FIGS. 5B and 5C, and the reaction handler executing the reaction operation (e.g., by transmitting a notification message to an external computing system).

In an example embodiment, a reaction operation may be processed by the computing system (e.g., computing platform 110, third-party computing platform 125, etc.) in conjunction with a connection action, where the connection action is defined with one or more associated reactions. For example, an instance of a connection action for a vehicle (a connection task) may progress through the task state machine like any other kind of task. For example, during the connection task the task state changes from PENDING to SUCCEEDED immediately when the vehicle connects to a backend system (e.g., a remote computing platform), without the vehicle having to do anything else other than check in. For example, reaction operations may be processed in response to the change in the state of the task. Thus, a connection action may also be utilized to design or include workflows that contain reaction operations (e.g., side-effects).

Figure 7:
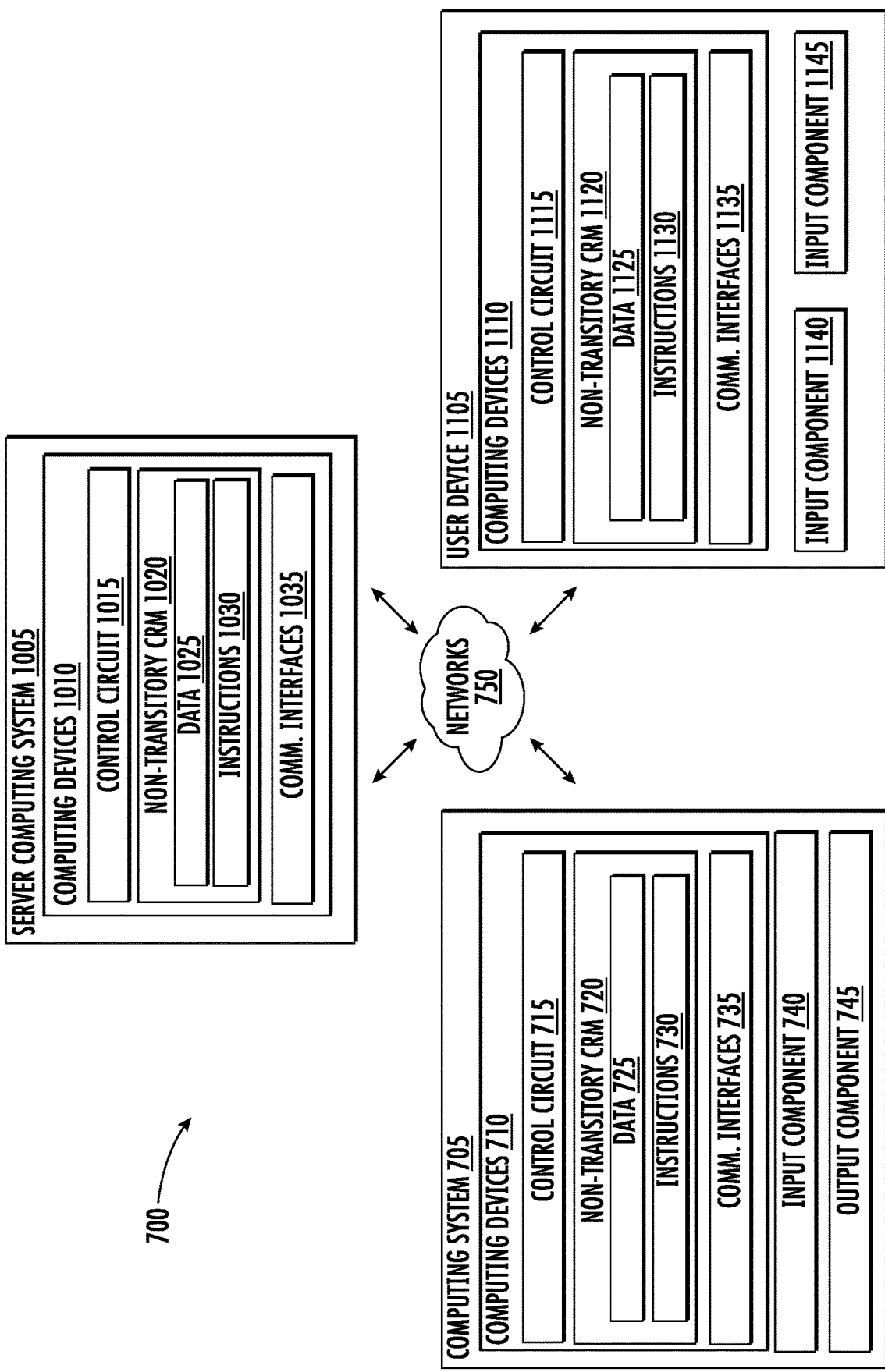
FIG. 7 illustrates a block diagram of an example computing ecosystem with computing components, according to example embodiments of the disclosure.

FIG. 7 illustrates a block diagram of an example computing system 700 according to an embodiment hereof. The computing system 700 includes a computing system 705 (e.g., a computing system onboard a vehicle including vehicle computing system 200), a server computing system 1005 (e.g., a remote computing system, cloud computing platform, remote computing platform 110, third-party computing platform 125, etc.), and a user device 805 (e.g., corresponding to user device 115) that are communicatively coupled over one or more networks 750.

The computing system 705 may include one or more computing devices 710 or circuitry. For instance, the computing system 705 may include a control circuit 715 and a non-transitory computer-readable medium 720, also referred to herein as memory. In an embodiment, the control circuit 715 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 715 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 715 may be programmed by one or more computer-readable or computer-executable instructions stored on the non-transitory computer-readable medium 720.

In an embodiment, the non-transitory computer-readable medium 720 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 720 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 720 may store information that may be accessed by the control circuit 715. For instance, the non-transitory computer-readable medium 720 (e.g., memory devices) may store data 725 that may be obtained, received, accessed, written, manipulated, created, and/or stored. The data 725 may include, for instance, any of the data or information described herein. In some implementations, the computing system 705 may obtain data from one or more memories that are remote from the computing system 705.

The non-transitory computer-readable medium 720 may also store computer-readable instructions 730 that may be executed by the control circuit 715. The instructions 730 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 715 to perform one or more functional tasks. The modules and computer-readable/executable instructions may be described as performing various operations or tasks when the control circuit 715 or other hardware component is executing the modules or computer-readable instructions.

The instructions 730 may be executed in logically and/or virtually separate threads on the control circuit 715. For example, the non-transitory computer-readable medium 720 may store instructions 730 that when executed by the control circuit 715 cause the control circuit 715 to perform any of the operations, methods and/or processes described herein. In some cases, the non-transitory computer-readable medium 720 may store computer-executable instructions or computer-readable instructions, such as instructions to perform at least a portion of the method of FIG. 6.

The computing system 705 may include one or more communication interfaces 735. The communication interfaces 735 may be used to communicate with one or more other systems. The communication interfaces 735 may include any circuits, components, software, etc. for communicating via one or more networks (e.g., one or more networks 750). In some implementations, the communication interfaces 735 may include for example, one or more of a communications controller, receiver, transceiver, transmitter, port, conductors, software and/or hardware for communicating data/information.

The computing system 705 may also include one or more user input components 740 that receives user input. For example, the user input component 740 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 705 may include one or more output components 745. The output components 745 may include hardware and/or software for audibly or visually producing content. For instance, the output components 745 may include one or more speakers, earpieces, headsets, handsets, etc. The output components 745 may include a display device, which may include hardware for displaying a user interface and/or messages for a user. By way of example, the output component 745 may include a display screen, CRT, LCD, plasma screen, touch screen, TV, projector, tablet, and/or other suitable display components.

The server computing system 1005 may include one or more computing devices 1010. In an embodiment, the server computing system 1005 may include or is otherwise implemented by one or more server computing devices. In instances in which the server computing system 1005 includes plural server computing devices, such server computing devices may operate according to sequential computing architectures, parallel computing architectures, or some combination thereof.

The server computing system 1005 may include a control circuit 1015 and a non-transitory computer-readable medium 1020, also referred to herein as memory 1020. In an embodiment, the control circuit 1015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1015 may be programmed by one or more computer-readable or computer-executable instructions stored on the non-transitory computer-readable medium 1020.

In an embodiment, the non-transitory computer-readable medium 1020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1020 may store information that may be accessed by the control circuit 1015. For instance, the non-transitory computer-readable medium 1020 (e.g., memory devices) may store data 1025 that may be obtained, received, accessed, written, manipulated, created, and/or stored. The data 1025 may include, for instance, any of the data or information described herein. In some implementations, the server computing system 1005 may obtain data from one or more memories that are remote from the server computing system 1005.

The non-transitory computer-readable medium 1020 may also store computer-readable instructions 1030 that may be executed by the control circuit 1015. The instructions 1030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1015 to perform one or more functional tasks. The modules and computer-readable/executable instructions may be described as performing various operations or tasks when the control circuit 1015 or other hardware component is executing the modules or computer-readable instructions.

The instructions 1030 may be executed in logically and/or virtually separate threads on the control circuit 1015. For example, the non-transitory computer-readable medium 1020 may store instructions 1030 that when executed by the control circuit 1015 cause the control circuit 1015 to perform any of the operations, methods and/or processes described herein. In some cases, the non-transitory computer-readable medium 1020 may store computer-executable instructions or computer-readable instructions, such as instructions to perform at least a portion of the method of FIG. 6.

The server computing system 1005 may include one or more communication interfaces 1035. The communication interfaces 1035 may be used to communicate with one or more other systems. The communication interfaces 1035 may include any circuits, components, software, etc. for communicating via one or more networks (e.g., one or more networks 750). In some implementations, the communication interfaces 1035 may include for example, one or more of a communications controller, receiver, transceiver, transmitter, port, conductors, software and/or hardware for communicating data/information.

The computing system 705 and/or the server computing system 1005 may also be in communication with a user device 1105 that is communicatively coupled over the one or more networks 750.

The user device 1105 may include one or more computing devices 1110. The user device 1105 may include a control circuit 1115 and a non-transitory computer-readable medium 1120, also referred to herein as memory 1120. In an embodiment, the control circuit 1115 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1115 may be programmed by one or more computer-readable or computer-executable instructions stored on the non-transitory computer-readable medium 1120.

In an embodiment, the non-transitory computer-readable medium 1120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 1120 may store information that may be accessed by the control circuit 1115. For instance, the non-transitory computer-readable medium 1120 (e.g., memory devices) may store data 1125 that may be obtained, received, accessed, written, manipulated, created, and/or stored. The data 1125 may include, for instance, any of the data or information described herein. In some implementations, the user device 1105 may obtain data from one or more memories that are remote from the user device 1105.

The non-transitory computer-readable medium 1120 may also store computer-readable instructions 1130 that may be executed by the control circuit 1115. The instructions 1130 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1115 to perform one or more functional tasks. The modules and computer-readable/executable instructions may be described as performing various operations or tasks when the control circuit 1115 or other hardware component is executing the modules or computer-readable instructions.

The instructions 1130 may be executed in logically or virtually separate threads on the control circuit 1115. For example, the non-transitory computer-readable medium 1120 may store instructions 1130 that when executed by the control circuit 1115 cause the control circuit 1115 to perform any of the operations, methods and/or processes described herein. In some cases, the non-transitory computer-readable medium 1120 may store computer-executable instructions or computer-readable instructions, such as instructions to perform at least a portion of the method of FIG. 6.

The user device 1105 may include one or more communication interfaces 1135. The communication interfaces 1135 may be used to communicate with one or more other systems. The communication interfaces 1135 may include any circuits, components, software, etc. for communicating via one or more networks (e.g., one or more networks 750). In some implementations, the communication interfaces 1135 may include for example, one or more of a communications controller, receiver, transceiver, transmitter, port, conductors, software and/or hardware for communicating data/information.

The user device 1105 may also include one or more user input components 1140 that receives user input. For example, the user input component 1140 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components may include a microphone, a traditional keyboard, cursor-device, joystick, or other devices by which a user may provide user input.

The user device 1105 may include one or more output components 1145. The output components 1145 may include hardware and/or software for audibly or visually producing content. For instance, the output components 1145 may include one or more speakers, earpieces, headsets, handsets, etc. The output components 1145 may include a display device, which may include hardware for displaying a user interface and/or messages for a user. By way of example, the output component 1145 may include a display screen, CRT, LCD, plasma screen, touch screen, TV, projector, tablet, and/or other suitable display components.

The one or more networks 750 may be any type of communications network, such as a local area network (e.g., intranet), wide area network (e.g., Internet), or some combination thereof and may include any number of wired or wireless links. In general, communication over one or more networks 750 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computer-implemented method related to an over-the-air (OTA) vehicle software update. The computer-implemented method may include obtaining an OTA vehicle software update for a plurality of vehicles; determining a task for a first vehicle among the plurality of vehicles based on the OTA vehicle software update, wherein the task is associated with a plurality of task states; determining, while processing the task with respect to the first vehicle, that the task has experienced a task state transition from a first task state among the plurality of task states to a second task state among the plurality of task states; in response to the task state transition, selecting a reaction operation from a plurality of reaction operations, wherein the reaction operation comprises a computing operation that is to be performed in response to the task state transition; and processing the reaction operation independently from the first vehicle performing the task.

Embodiment 2 includes the method of embodiment 1. In this embodiment, the reaction operation is logically and temporally decoupled from the task state transition of the first task state to the second task state.

Embodiment 3 includes the method of embodiment 1. In this embodiment, selecting the reaction operation from the plurality of reaction operations comprises identifying the reaction operation based on an action associated with the task.

Embodiment 4 includes the method of embodiment 3. In this embodiment, the action comprises upgrading a software version onboard the first vehicle.

Embodiment 5 includes the method of any of embodiments 1 to 4. In this embodiment, the method further includes retrieving information about the reaction operation at a time when the first task state transitions to the second task state.

Embodiment 6 includes the method of any of embodiments 1 to 5. In this embodiment, the method may include queuing the reaction operation such that the reaction operation is processed asynchronously from the first vehicle performing the task.

Embodiment 7 includes the method of any of embodiments 1 to 6. In this embodiment, the plurality of vehicles belong to a same class of the vehicles, and the computer-implemented method further comprises: determining an action to be performed by the class of vehicles; and associating the reaction operation with the action.

Embodiment 8 includes the method of any of embodiments 1 to 7. In this embodiment, the reaction operation includes at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

Embodiment 9 includes the method of any of embodiments 1 to 8. In this embodiment, the task corresponds to a connection action of the first vehicle connecting to one or more computing systems via a network, and the connection action is defined by associating the reaction operation with the connection action.

Embodiment 10 relates to a computing system. The computing system may include a control circuit. The control circuit may be configured to: obtain an over-the-air (OTA) vehicle software update for a plurality of vehicles; determine a task for a first vehicle among the plurality of vehicles based on the OTA vehicle software update, wherein the task is associated with a plurality of task states; determine, while processing the task with respect to the first vehicle, that the task has experienced a task state transition from a first task state among the plurality of task states to a second task state among the plurality of task states; in response to the task state transition, select a reaction operation from a plurality of reaction operations, wherein the reaction operation comprises a computing operation that is to be performed in response to the task state transition; and process the reaction operation independently from the vehicle performing the task.

Embodiment 11 includes the computing system of embodiment 10. In this embodiment, the reaction operation is logically and temporally decoupled from the task state transition of the first task state to the second task state.

Embodiment 12 includes the computing system of any of embodiments 10 and 11. In this embodiment, the control circuit is configured to retrieve information about the reaction operation at a time when the first task state transitions to the second task state.

Embodiment 13 includes the computing system of embodiment 12. In this embodiment, the control circuit is configured to queue the reaction operation such that the reaction operation is processed asynchronously from the first vehicle performing the task.

Embodiment 14 includes the computing system of any of embodiments 10 to 13. In this embodiment, the plurality of vehicles belong to a same class of the vehicles, and the control circuit is configured to: determine an action to be performed by the class of vehicles; and associate the reaction operation with the action.

Embodiment 15 includes the computing system of any of embodiments 10 to 14. In this embodiment, the reaction operation processed by the control circuit comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

Embodiment 16 includes the computing system of any of embodiments 10 to 15. In this embodiment, the task corresponds to a connection action of the first vehicle connecting to one or more computing systems via a network, and the connection action is defined by associating the reaction operation with the connection action.

Embodiment 17 relates to one or more non-transitory computer-readable media that store instructions that are executable by a control circuit to perform operations. The control circuit may obtain an over-the-air (OTA) vehicle software update for a plurality of vehicles; determine a task for a first vehicle among the plurality of vehicles based on the OTA vehicle software update, wherein the task is associated with a plurality of task states; determine, while processing the task with respect to the first vehicle, that the task has experienced a task state transition from a first task state among the plurality of task states to a second task state among the plurality of task states; in response to the task state transition, select a reaction operation from a plurality of reaction operations to be processed; and process the reaction operation independently from the first vehicle performing the task.

Embodiment 18 includes the computing system of embodiments 17. In this embodiment, the reaction operation is logically and temporally decoupled from the task state transition of the first task state to the second task state.

Embodiment 19 includes the computing system of any of embodiments 17 to 18. In this embodiment, the one or more non-transitory computer-readable media store instructions that are executable by the control circuit to: select the reaction operation from the plurality of reaction operations by identifying the reaction operation based on an action associated with the task, retrieve information about the reaction operation at a time when the first task state transitions to the second task state, and queue the reaction operation such that the reaction operation is processed asynchronously from the first vehicle performing the task.

Embodiment 20 includes the computing system of any of embodiments 17 to 19. In this embodiment, the reaction operation comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the disclosed subject matter has been described in detail with respect to various example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the disclosed subject matter as would be readily apparent to one of ordinary skill in the art. For instance, features illustrated or described as part of one embodiment may be used with another embodiment to yield a still further embodiment. Thus, it is intended that the disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the disclosure is by way of example rather than by way of limitation, and the subject disclosure does not preclude inclusion of such modifications, variations or additions to the disclosed subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computer-implemented method, comprising:
   determining a task for a first vehicle among a plurality of vehicles based on an over-the-air (OTA) vehicle software update for the plurality of vehicles, wherein the task is associated with a plurality of task states;
   determining, while processing the task with respect to the first vehicle, that the task has experienced a task state transition from a first task state among the plurality of task states to a second task state among the plurality of task states;
   in response to the task state transition, selecting a reaction operation from a plurality of reaction operations based on an action associated with the task and retrieving information for processing the reaction operation from a reaction queue, wherein the reaction operation comprises a computing operation that is to be performed in response to the task state transition and the information for processing the reaction operation includes at least one of a reaction type, reaction parameter information, or reaction context information; and processing the reaction operation independently from the first vehicle performing the task based on the information.

2. The computer-implemented method of claim 1, wherein the reaction operation is logically and temporally decoupled from the task state transition of the first task state to the second task state.

3. The computer-implemented method of claim 1, wherein the information for processing the reaction operation is retrieved based on a rule definition stored in a rule definition cache which caches the rule definition according to an identifier associated with the rule definition, and the rule definition includes one or more reaction operations which are associated with one or more actions from the rule definition.

4. The computer-implemented method of claim 1, wherein the action comprises upgrading a software version onboard the first vehicle.

5. The computer-implemented method of claim 1, further comprising queuing the reaction operation such that the reaction operation is processed asynchronously from the first vehicle performing the task.

6. The computer-implemented method of claim 1, wherein the plurality of vehicles belong to a same class of the vehicles, and the computer-implemented method further comprises:

determining the action to be performed by the class of vehicles; and associating the reaction operation with the action.

7. The computer-implemented method of claim 1, wherein the reaction operation comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

8. The computer-implemented method of claim 1, wherein:

the task corresponds to a connection action of the first vehicle connecting to one or more computing systems via a network, and the connection action is defined by associating the reaction operation with the connection action.

9. A computing system, comprising:

a control circuit configured to:

determine a task for a first vehicle among a plurality of vehicles based on an over-the-air (OTA) vehicle software update for the plurality of vehicles, wherein the task is associated with a plurality of task states;

determine, while processing the task with respect to the first vehicle, that the task has experienced a task state transition from a first task state among the plurality of task states to a second task state among the plurality of task states;

in response to the task state transition, select a reaction operation from a plurality of reaction operations to be processed based on an action associated with the task and retrieve information for processing the reaction operation from a reaction queue, wherein the reaction operation comprises a computing operation that is to be performed in response to the task state transition and the information for processing the reaction operation includes at least one of a reaction type, reaction parameter information, or reaction context information; and process the reaction operation independently from the vehicle performing the task based on the information.

10. The computing system of claim 9, wherein the reaction operation is logically and temporally decoupled from the task state transition of the first task state to the second task state.

11. The computing system of claim 9, wherein the control circuit is configured to queue the reaction operation such that the reaction operation is processed asynchronously from the first vehicle performing the task.

12. The computing system of claim 9, wherein the plurality of vehicles belong to a same class of the vehicles, and the control circuit is configured to:

determine the action to be performed by the class of vehicles; and associate the reaction operation with the action.

13. The computing system of claim 9, wherein the reaction operation processed by the control circuit comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

14. The computing system of claim 9, wherein:

the task corresponds to a connection action of the first vehicle connecting to one or more computing systems via a network, and the connection action is defined by associating the reaction operation with the connection action.

15. One or more non-transitory computer-readable media comprising instructions that are executable by a control circuit to:

determine a task for a first vehicle among a plurality of vehicles based on an over-the-air (OTA) vehicle software update for the plurality of vehicles, wherein the task is associated with a plurality of task states;

determine, while processing the task with respect to the first vehicle, that the task has experienced a task state transition from a first task state among the plurality of task states to a second task state among the plurality of task states;

in response to the task state transition, select a reaction operation from a plurality of reaction operations to be processed based on an action associated with the task and retrieve information for processing the reaction operation from a reaction queue, wherein the reaction operation comprises a computing operation that is to be performed in response to the task state transition and the information for processing the reaction operation includes at least one of a reaction type, reaction parameter information, or reaction context information; and process the reaction operation independently from the first vehicle performing the task based on the information.

16. The one or more non-transitory computer-readable media of claim 15, wherein the reaction operation is logically and temporally decoupled from the task state transition of the first task state to the second task state.

17. The one or more non-transitory computer-readable media of claim 15, wherein the one or more non-transitory computer-readable media store instructions that are executable by the control circuit to: queue the reaction operation such that the reaction operation is processed asynchronously from the first vehicle performing the task.

18. The one or more non-transitory computer-readable media of claim 15, wherein the reaction operation comprises at least one of: (a) transmitting a notification to the first vehicle and/or a user associated with the first vehicle about a status of the OTA vehicle software update, (b) transmitting information about the OTA vehicle software update to an external computing system which tracks status information for OTA vehicle software updates associated with the plurality of vehicles, (c) changing a property associated with the first vehicle at the external computing system, or (d) waking up a network device associated with the first vehicle.

* * * * *